INVENTORS
RALPH C. ADAMS
JOHN R. ANDERSON
BY Theodore B. Roessel
ATTORNEY

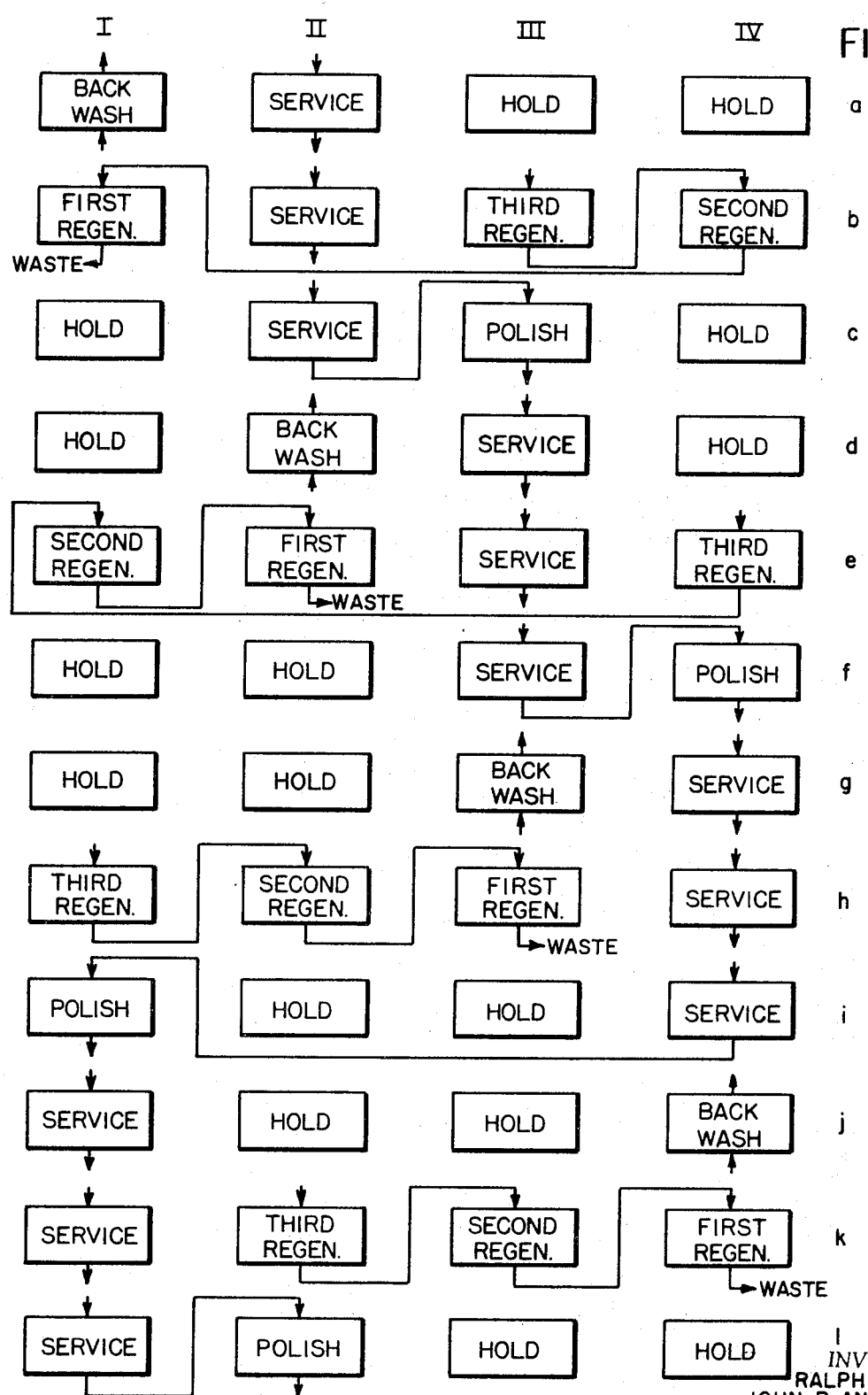

United States Patent Office 3,632,506
Patented Jan. 4, 1972

3,632,506
METHOD OF OPERATING AND REGENERATING ION EXCHANGE APPARATUS
Ralph C. Adams, Midland Park, and John R. Anderson, Cranbury, N.J., assignors to Sybron Corporation, Rochester, N.Y.
Filed July 17, 1969, Ser. No. 842,449
Int. Cl. B01d 15/06
U.S. Cl. 210—34       2 Claims

ABSTRACT OF THE DISCLOSURE

A method of operating ion exchange apparatus in which three or more beds of ion exchange material are used in fixed bed operation so that at least one bed is in service at all times while the other beds are in various stages of regeneration. Fluid to service is continuous in that before the resin capacity of one bed is exhausted, the fluid being treated is directed to a freshly regenerated bed and then to service. During the regeneration stage, the partly spent regenerant and subsequent rinse from one regenerating bed is directed to an exhausted bed to utilize as completely as possible any excess regenerant in the spent regenerant and rinse fluid.

BACKGROUND OF THE INVENTION

The present invention relates generally to a fixed bed method for the operation and regeneration of ion exchange apparatus. More specifically, the present invention relates to a method for the progressive operation and regeneration of at least three fixed beds of ion exchange material wherein each bed is at any given time in a different phase of operation or regeneration from any other bed. Further, with respect to the invention, at least one bed is available at all times for removal of ions from the incoming fluid and each exhausted bed is regenerated with regenerant of increasing concentrations.

During the service operation of a fixed bed ion exchanger, the bed of ion exchange material may be considered as divided into three adjacent zones. The first zone, which lies immediately in contact with the incoming fluid to be treated, becomes exhausted in its ability to exchange ions with those in the incoming fluid after only a brief period of operation. The second zone is a transitional zone which is only partly exhausted in its ion exchange ability. The third zone consists of ion exchange material which has not been in contact with any exchangeable ions in the incoming fluid and has the greatest ion exchange ability.

As the service operation continues with the fluid to be treated flowing through the bed, the interfaces between the three zones move through the bed of ion exchange material in the direction of the service flow, until the third zone is displaced by the second, or partially exhausted zone. At this point in the operation of a fixed bed ion exchanger, the ability of the bed to remove ions from the incoming fluid deteriorates and unwanted ions may be detected in the effluent of treated fluid from the bed. Accordingly, in normal operation, the service cycle of the ion exchanger is usually terminated before the second or partially exhausted zone has completely displaced the third zone even though the bed still contains some material capable of performing an ion exchange function. It is thus apparent that in normal operation, the full ion exchange capacity of the fixed bed cannot be utilized without deterioration of effluent quality.

A similar situation develops, only in reverse, during regeneration of a fixed bed ion exchanger in that the regenerant solution passing through the exhausted material displaces previously exchanged ions from the ion exchange material so that after a brief period of operation three zones are formed. The first zone contains regenerated ion exchange material, the second zone contains partially regenerated ion exchange material and the third zone contains exhausted ion exchange material with the interface between the zones moving through the bed in the direction of regenerant flow. When the third or exhausted zone has been displaced by the second or partially regenerated zone, the ability of the regenerant to regenerate the bed deteriorates and unused regenerant may be detected in the effluent from the bed.

It is well known in the art, that in order to regenerate completely any given amount of ion exchange material, a regenerant solution must be used which contains an amount of ions substantially in excess of the stoichiometric amount necessary to displace the ions that have been removed by the ion exchanger. In general, the larger the excess employed, the more complete the displacement of the removed ions from the ion exchange material, with resultant improvement in effluent quality and ion exchanger capacity. This excess regenerant is usually discharged to waste so that fixed bed operation, is inefficient in both service operation and regeneration in that (a) incomplete use is made of the ion exchange material during service and (b) regeneration of all exhausted ion exchange material requires that some regenerant be wasted.

It is well known in the art that counter current ion exchange offers more efficient utilization of both the ion exchange material and the regenerant than does fixed bed operation. Since counter current methods of ion exchange are known in the art, it is sufficient for purposes of the present invention merely to state that in such methods of operation, fresh ion exchange material is continuously introduced into the system and moved counter to the service flow so that the three zones described hereinabove remain stationary with respect to service flow. In like respect, exhausted ion exchange material is moved counter to the flow of regenerant so that the exhausted material is contacted with an increasing concentration of regenerant. While counter current ion exchange makes more efficient use of both the ion exchange material and the regenerant, the hydraulic and mechanical problems presented in moving the material often outweigh the inefficiency of fixed bed operation so that the inefficiency of fixed bed operation is often overlooked in order to benefit from ease of operation.

SUMMARY OF THE PRESENT INVENTION

Operation and regeneration of fixed bed ion exchange apparatus in accordance with the method of the present invention provides substantially complete utilization of the ion exchange capacity of both the bed of ion exchange material and the regenerant without the hydraulic and mechanical drawbacks of counter current operation. The present invention can be characterized in one aspect thereof by the provision of a method for operating and regenerating ion exchange apparatus wherein at least three fixed beds of ion exchange material are operated progressively so that at any given time, at least one of the vessels is in service while other vessels are in various stages of regeneration. The regeneration according to the present invention permits substantially complete utilization of the regenerant in that both the regenerant effluent and the rinse effluent from a regenerating bed is passed through an exhausted bed so that any excess regenerant present in the spent regenerant and rinse may be used to partially regenerate the exhausted bed. In this manner, the regenerant is substantially completely utilized.

Operation according to one embodiment of the invention also permits substantially complete utilization of the ion exchange material during the service cycle in that the fluid being treated, upon detection of unwanted ions, is passed through a subsequent bed of regenerated ion exchange material to aid in the removal of the unwanted ions. In this arrangement, each fixed bed of ion exchange material is completely exhausted in two phases. In the first phase, the fluid to be treated is passed through a first regenerated bed to service until unwanted ions are detected in the effluent, that is, until the bed contains only a first zone of exhausted material and a second zone of partially exhausted material. In the second phase, the fluid to be treated continues to pass through the partially exhausted material of the first bed but is then also passed through a second freshly regenerated bed before flowing to service, the second bed acting as a polisher to remove any ions not removed by the partially exhausted bed. This second phase continues until the first bed is completely exhausted at which time flow to service continues only through the second bed.

OBJECTS OF THE INVENTION

It is an object of the present invention to provide a method of operating and regenerating fixed bed ion exchange apparatus which increases the efficiency of both the exhaustion and regeneration of the beds.

Another object of the present invention is to provide a method of operating and regenerating ion exchange apparatus wherein at least three beds of ion exchange material are employed, at least one of the beds being in service at any one time with the remaining beds being in various stages of regeneration.

A further object of the present invention is to provide a method for fixed bed operation of ion exchange apparatus which utilizes substantially the entire ion exchange capacity of the ion exchange material.

A yet further object of the present invention is to provide a method for the regeneration of fixed bed ion exchange apparatus which permits greater regenerant utilization over present methods.

Yet another object of the present invention is to provide a method for operating and regenerating fixed bed ion exchange apparatus wherein both the regenerant and rinse effluent of a regenerating bed are successively passed through another exhausted bed to permit substantially complete utilization of the regenerant.

DESCRIPTION OF THE DRAWINGS

FIG. 3 a–l is a diagram similar to FIG. 2 only showing the step-by-step operation of another embodiment of the invention.

DESCRIPTION OF THE PREFERRED EMBODIMENTS

Figure 1:
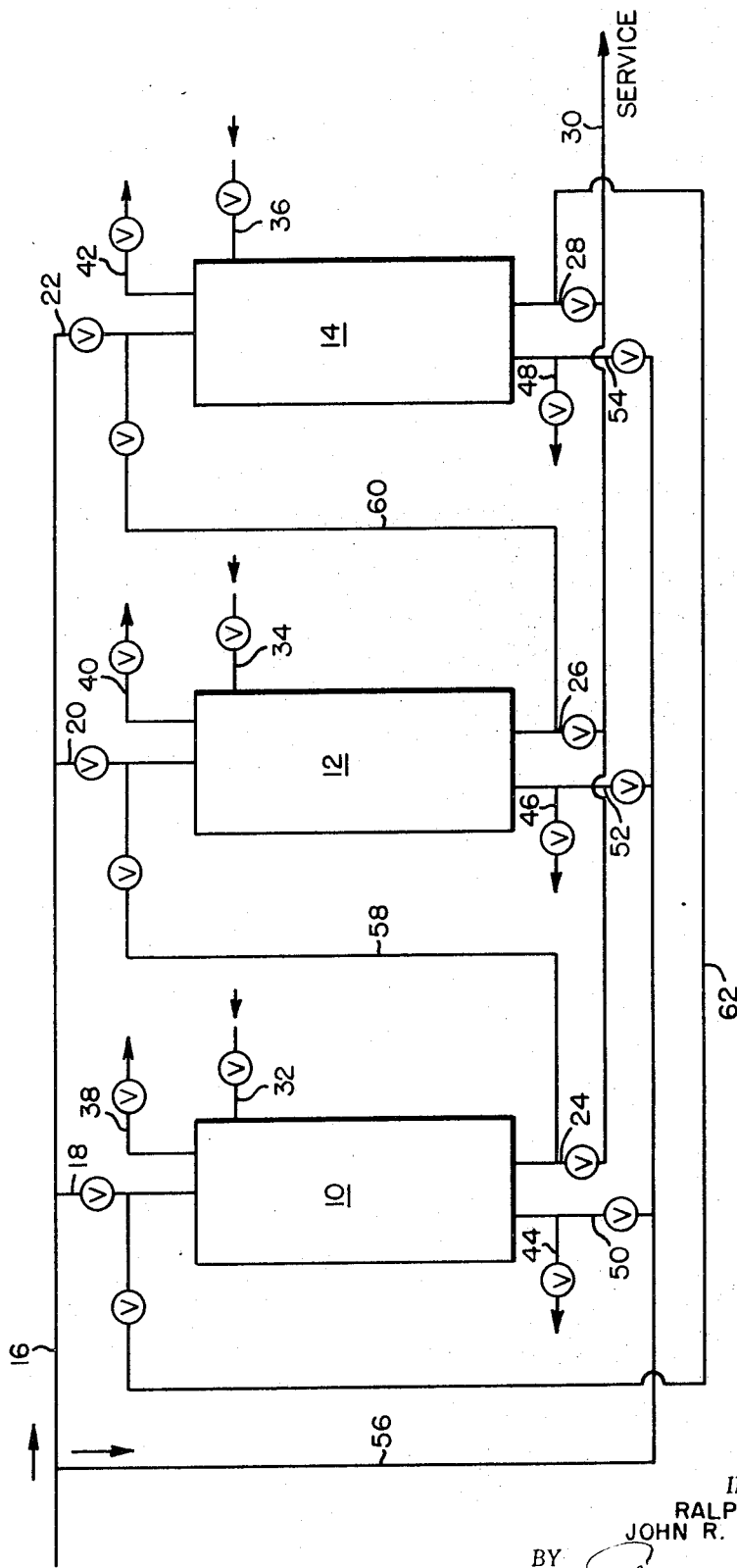
FIG. 1 is a schematic representation of the apparatus of our invention.

Referring to the drawing, FIG. 1 shows the ion exchange apparatus of the invention to include at least three vessels, 10, 12 and 14. Each vessel contains a fixed bed of ion exchange material together with various internal collectors and distributors and other piping (not shown) for fixed bed operation well known in the art.

A main inlet line 16 conducts the fluid to be treated into the top of each vessel through valved inlets 18, 20 and 22. The untreated fluid flows downwardly through the fixed ion exchange bed in each vessel and leaves the vessels as treated fluid through bottom located valved outlets 24, 26 and 28. Each of the outlets is connected to a main service line 30 which conducts the treated fluid to service. A valved pipe 58 connects the bottom of vessel 10 with the top of vessel 12 and in like respect, valved pipes 60 and 62 connect the bottom of vessels 12 and 14 to the top of vessels 14 and 10 respectively. With this arrangement of valves and pipes, flow may be directed in series and in parallel through the vessels; that is in series from one vessel to another or in parallel directly into any selected vessel.

Also located in the top of each vessel is a valved regenerant inlet 32, 34 and 36 and a valved waste outlet 38, 40 and 42. A second valved waste outlet 44, 46 and 48 is located in the bottom of each vessel. Each vessel is also provided with a bottom located valved backwash water inlet 50, 52 and 54 connected to the mainline 16 by a branch line 56.

OPERATION

In order to describe the operation of the invention and by way of illustration only, the invention shall be described as if water were the fluid being treated although it should be appreciated that any fluid normally treated by an ion exchange process can be treated with the method of the invention. Further, by way of illustration only, the cycle of operation shall be described as beginning at a point in the operation wherein the ion exchange material or resin in vessel 10 has been exhausted and the vessel is in a backwash stage; vessel 12 is in service and delivering treated water to main service line 30; and vessel 14 is in a "hold" condition and about to enter the final regenerating stage wherein any suitable regenerants, such as brine can be introduced into this vessel through valved regenerant inlet 36.

In order to backwash the resin bed in vessel 10, the valved backwash inlet 50 and the valved waste outlet 38 are open to permit untreated water to flow from branch line 56 upwardly through the vessel. While backwashing is proceeding in vessel 10, vessel 12 is in service with valved inlet 20 and valved outlet 26 open to permit untreated water to flow downwardly through the resin bed in vessel 12 to service through main service line 30.

After vessel 10 has completed its backwash cycle and while vessel 12 remains in its service cycle, vessel 14 begins the third phase of its regenerating cycle. This is accomplished by opening valved regenerant inlet 36 and valved pipe 62 and waste outlet 44 to permit the regenerant to flow downwardly through vessel 14 to regenerate the resin bed in this vessel. As stated hereinabove, the common practice is to employ an excess of regenerant in order to insure the complete regeneration of the spent resin. Therefore, with valved pipe 62 and waste outlet 44 also open, the spent regenerant from vessel 14 can flow through pipe 62 and downwardly through the exhausted resin in vessel 10 before being discharged to waste through outlet 44 so that the unspent regenerant in the effluent from vessel 14 will be used to partially regenerate the exhausted resin in vessel 10. This represents the first phase of the regenerating cycle of vessel 10.

With vessel 12 still in service, the next step in the cycle of operation is to rinse excess regenerant from the freshly regenerated resin in vessel 14 and pass the rinse effluent through vessel 10. This is accomplished by opening valved inlet 22, valved pipe 62 and valved waste outlet 44 to permit untreated water from main inlet line 16 to flow downwardly through vessel 14 and rinse the excess regenerant from the regenerated resin. The rinse liquid, together with excess regenerant, then passes out the bottom of vessel 14, through line 62 into the top of vessel 10, downwardly through the exhausted resin bed in the vessel 10 and is discharged through bottom located outlet 44 to waste. The purpose of passing the rinse effluent from vessel 14 through the exhausted resin in vessel 10 is to permit the excess regenerant rinsed from the resin bed in vessel 14 to act on the exhausted resin in vessel 10 as a second phase in the regenerating cycle of the exhausted resin in this vessel. Thus, passing both the regenerant and rinse effluent from one regenerating bed through another exhausted bed, insures substantially complete utilization of the regenerant.

The next step in the cycle of operation is optional and it is utilized only when it is desired to completely exhaust a resin bed prior to regeneration. In this step, vessel 10, containing the resin which has undergone two phases of its regenerating cycle is placed in a hold condition while flow to service continues through both vessels 12 and 14. When the minimum of three vessels are used as shown, for example, in FIG. 1, the depth of the resin and resin volume in each vessel should be sufficient to insure that series flow of untreated fluid through not more than two vessels will be sufficient to substantially completely exhaust the first vessel without deterioration of effluent quality from the second in series vessel. When more than the minimum of three vessels are used as shown, for example, in FIG. 3 and described hereinbelow, the depth and volume of the resin bed in each vessel may be reduced and any deterioration in effluent quality resulting from an insufficient amount of resin may be compensated for simply by adding another vessel containing a freshly regenerated resin to the flow path of the fluid being treated. In this respect, vessel 12 which has been in service, may reach the point where its resin, while not yet completely exhausted, has been exhausted to such an extent that it no longer can remove all of the undesired ions from the raw inlet water. When this occurs and excessive leakage of unwanted ions is detected in the effluent of the ion exchanger, the normal procedure is to immediately discontinue the flow to service and regenerate the resin bed. The present invention, however, appreciates that a portion of the resin bed in vessel 12 is still capable of performing an ion exchange function. In order to utilize this portion of the resin bed, flow of water from vessel 12 directly to service is discontinued and the flow instead diverted first through vessel 14 and then to service. This is accomplished by closing valved outlet 26 and opening valved pipe 60 and valved outlet 28. With this arrangement, any ions not removed by the partially exhausted resin in vessel 12 will be removed by the freshly regenerated resin in vessel 14 so that the resin bed in vessel 14 acts as a polishing step to insure maximum removal of the undesired ions. With the resin bed in vessel 14 acting as a polishing step, the ion exchange can continue in vessel 12 until substantially all of the ion exchange capacity of the resin bed in vessel 12 is utilized and the resin bed is substantially completely exhausted in its ability to remove further any unwanted ions from the influent water. At this point, flow of water to service is continued only through vessel 14 while the exhausted resin in vessel 12 undergoes a cycle of backwashing. This is accomplished by opening valved inlet 22 to permit the water flowing from main inlet line 16 to flow directly through vessel 14 to service. Bottom located backwash inlet 52 and valved waste outlet 40 of vessel 12 are opened to permit upflow through vessel 12 and backwashing of the resin bed.

During the backwashing of the resin in vessel 12, vessel 10 remains in the hold condition until hte backwashing is completed. Thereafter, valved regenerant inlet 32 of vessel 10, valved pipe 58 and valved waste outlet 46 of vessel 12 are opened to permit a regenerant to flow downwardly through vessel 10 to complete the regenerating cycle of the resin bed located therein. It should be appreciated that the regenerant effluent from vessel 10 passes through vessel 12 to begin the regenerating cycle of the spent resin in vessel 12. With vessel 14 continuing in its service cycle, vessel 10 is rinsed of excess regenerant and the rinse effluent together with the excess regenerant passed through service vessel 12. This is accomplished by opening valved inlet 18, valved pipe 58 and valved discharge 46 to permit untreated water from main inlet line 16 to flow downwardly through vessel 10, through valved pipe 58 into the top of vessel 12, downwardly through this vessel and through valve discharge 46 to waste. Any excess regenerant which is rinsed from the resin bed in vessel 10 is carried by the rinse effluent through vessel 12 to perform the second phase in the regenerating cycle of the resin bed in vessel 12.

After partial regeneration of the resin bed in vessel 12, this vessel can be placed in an optional hold condition similar to that described hereinabove with respect to vessel 10. In this respect, vessel 14 is nearing the end of its service cycle so that the ion exchange resin therein is no longer capable of removing the unwanted ions from the untreated water. Accordingly, flow to service directly from vessel 14 is discontinued and the effluent from this vessel diverted through vessel 10 which contains the freshly regenerated bed of ion exchange resin. This diversion of flow is accomplished simply by closing valved outlet 28 and opening valved pipe 62 and valved outlet 24 so that the resin bed in vessel 10 may act as a polishing step to remove any unwanted ions not removed by the resin bed in vessel 14. This cycle continues until the resin bed in vessel 14 is substantially completely exhausted in its ability to remove further any unwanted ions from the influent water.

When the resin in vessel 14 has been completely exhausted, the resin bed is backwashed while flow to service continues through vessel 10. During this period, vessel 12 is in a hold condition. Flow to service through vessel 10 is accomplished by opening valved inlet 18 and valved outlet 24. Backwashing of the resin in vessel 14 is accomplished by opening valved backwash inlet 54 and waste outlet 42 to permit untreated water from branch line 56 to flow upwardly through the vessel. Upon completion of the backwashing of the resin in vessel 14, valved regenerant inlet 34 of vessel 12, valved pipe 60 and valved waste outlet 48 of vessel 14 are open to permit the downflow of regenerant through vessel 12 to complete the regeneration of the resin bed therein. The effluent spent regenerant from vessel 12 then flows through valved pipe 60 and vessel 14 before being discharged to waste so that any unspent regenerant may be used to being the regenerating cycle of the resin in vessel 14. With vessel 10 continuing to deliver treated water to service, the regenerated resin in vessel 12 is rinsed by opening valved inlet 20, valved pipe 60 and valved waste outlet 48. This permits the untreated water from main inlet line 16 to flow through vessel 12 and rinse excess regenerant from the resin bed therein. Rinse effluent from vessel 12, together with excess regenerant is then passed through valve pipe 60 and into vessel 14 to perform the second phase in the regeneration of the exhausted resin in service vessel 14. After rinsing, vessel 14 may be placed in the optional hold condition described hereinabove with respective vessels 10 and 12. In such cases, flow to service through vessel 10 continues until unwanted ions are detected in the effluent of vessel 10. When this occurs, flow through vessel 10 alone is discontinued and the effluent from this vessel diverted to service through newly regenerated vessel 12. This permits the fresh resin in vessel 12 to act as a polishing step to remove any unwanted ions which the now partially exhausted resin bed in vessel 10 has failed to remove.

This completes the cycle of operation and the next step is to remove vessel 10 from service so that the resin bed therein can be backwashed, while vessel 14 is in a hold condition and vessel 12 is delivering treated water to service.

Figure 2:
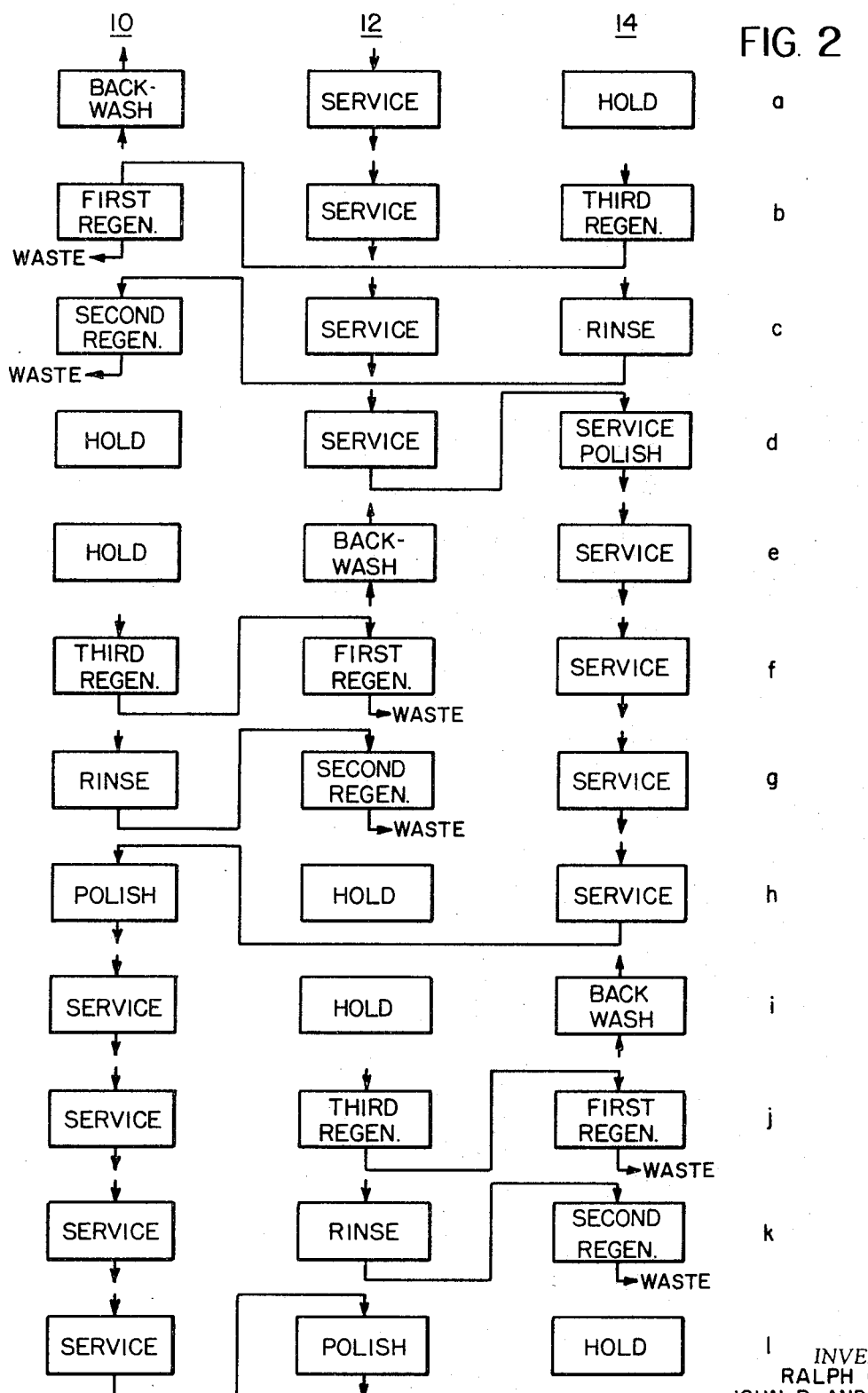
FIG. 2 a–l is a block diagram showing the step-by-step operation of the embodiment shown in FIG. 1.

In order to more clearly illustrate the steps of the method of the present invention, FIG. 2 a–l shows schematically the steps of the method. As illustrated in FIG. 2, steps d, and h and l are optional in that when undesired ions are detected in the effluent of the service vessel, it may be desirable to immediately remove the vessel from service instead of passing the effluent through a freshly regenerated resin as shown. This would, of course, eliminate the necessity of maintaining one vessel in a hold condition during the time required to completely exhaust the resin in one of the in-service vessels. Further, the hold sequence indicated at steps a, c and i can be minimized by the proper control of the time and rate of regenerant introduction and rinsing.

Referring to FIG. 3 a–l, there is shown schematically the operation of another embodiment wherein the progressive mode of operation of the present invention is employed with four service vessels. For purposes of illustration only, the cycle of operation of this embodiment is shown in FIG. 3a as beginning with vessel I containing a completely exhausted resin in the backwash cycle, vessel II delivering treated water to service and vessels III and IV in a hold condition. As shown in FIG. 3b, the regenerant effluent from vessel III is directed through vessel IV and then vessel I so that any excess regenerant from vessel III will also contact first the resin in vessel IV and then the exhausted resin in vessel I. The excess regenerant from vessel IV represents small amounts of the available regenerant so that all of the excess carried over from vessel IV into vessel I is utilized to regenerate a portion of the exhausted resin in vessel I. The effluent of vessel I is discharged to waste. It should be understood that while not shown, vessel III is then rinsed with the rinse effluent following the same path as that shown in FIG. 3b. In the next step, as shown in FIG. 3c, vessel III which contains the freshly regenerated and rinsed resin is used as a polishing step to remove any unwanted ions present in the effluent from vessel II prior to discharging the treated fluid to service. During this step, vessels I and IV are in a hold condition.

In the next step of operation, FIG. 3d, vessel II now completely exhausted is in a backwashing cycle and vessel III alone is delivering treated water to service while vessels I and IV remain in a hold position. In FIG. 3e, fresh regenerant is introduced into vessel IV with the regenerant effluent and subsequently the rinse effluent being displaced through vessels I and II to expose the resin bed in these vessels to any excess regenerant from vessel IV. During this cycle of operation, vessel III alone is delivering treated liquid to service. In FIG. 3f, the freshly regenerated and rinsed resin is utilized as the polishing step to remove any undesired ions from the effluent of vessel III before the treated liquid is discharged to service.

In FIG. 3g, the resin in vessel III now exhausted, is backwashed while vessel IV delivers treated liquid to service and vessels I and II remain in a hold condition.

In FIG. 3h, fresh regenerant is introduced into vessel I with the regenerant effluent and subsequent rinse being displaced through vessels II and III while vessel IV remains in service. After complete regeneration of vessel I, this vessel, as shown in FIG. 3i may be utilized as a polisher to remove any unwanted ions from the effluent of vessel IV which now has a reduced ion exchange capacity. FIG. 3j shows backwashing of the resin in vessel IV which is now exhausted while flow to service continues through vessel I only, vessels II and III being in a hold condition. In FIG. 3k, fresh regenerant is introduced into vessel II with the regenerant effluent and subsequent rinse effluent being displaced in vessel III and then vessel IV while vessel I delivers treated fluid to service. FIG. 3l completes the cycle of operation wherein the effluent from vessel I is polished by passage through the freshly regenerated resin in vessel II before being discharged to service.

Thus, it should be appreciated that the present invention accomplishes its intended objects in providing a method for operating and regenerating ion exchange apparatus which increases the efficiency of fixed bed operation by utilizing substantially the entire ion exchange capacity of both the resin and the regenerant while maintaining a constant flow of treated liquid to service.

It should be appreciated that the method of regeneration of the present invention exposes the exhausted ion exchange material to a progressive regenerant treatment with the most exhausted ion exchange material being first contacted with the least concentrated or least available regenerant, the resin progressively becoming more highly regenerated as it is contacted with higher concentrated regenerant. The last step in the regeneration comprises the contacting of the almost completely regenerated ion exchange material with the freshest and highest concentrated regenerant. It should be further appreciated that the progressive regeneration according to the present invention is accomplished with the ion exchange materials remaining in situ. Further, the technique described herein permits the discharge to waste of the most highly contaminated waste regenerant without the necessity of passing this highly contaminated waste regenerant through any but a small fraction of the ion exchange material in the system.

While the present invention has been described with respect to the most common method of operating ion exchange units, i.e., downflow service followed by downflow regeneration, it should be apparent to all versed in the art that the method of the present invention may also be used in upflow operation or in various combinations of downflow and upflow service and regeneration.

It should also be evident to those versed in the art, that the regenerating technique described herein is equally applicable where the service vessel is not the regenerating vessel and the ion exchange materials are transferred from the service vessel to other vessels for regeneration. In such cases, the progressive mode of regeneration described herein may be followed in the regenerating vessels, and the regenerated ion exchange materials transferred back to the service vessel.

Having thus described the invention, what is claimed as new is:

1. A method of operating and regenerating ion exchange systems employing at least three service vessels and having conduit and valve means constructed and arranged to direct the fluid to be treated and regenerant into the vessels in both series and parallel flow, each vessel containing a bed of ion exchange material which remains in said vessels during both an exhaustion and a regeneration cycle, the method comprising the steps of:

(a) exhausting said beds of ion exchange material in said service vessels in sequence one after another by
 (i) passing a fluid to be treated to service through a first vessel until the bed of ion exchange material therein is partly exhausted and thereafter passing the fluid to be treated through a series of said service vessels including said first vessel and a second downstream vessel until the bed of ion exchange material in said first vessel is substantially completely exhausted,
 (ii) discontinuing flow to service through said first vessel while continuing flow of treated fluid to service through said second vessel until the bed of ion exchange material therein is partly exhausted, and
 (iii) passing the fluid to be treated through a series of said service vessels including said second vessel and a third downstream vessel until the bed of ion exchange material in said second vessel is substantially completely exhausted and thereafter discontinuing flow to service through said second service vessel while continuing flow of treated fluid to service through at least said third service vessel;

(b) passing a regenerant through said first service vessel to regenerate the bed of ion exchange material therein; and (c) regenerating the substantially completely exhausted bed of ion exchange material in said second downstream service vessel by
 (i) passing through said second service vessel the regenerant effluent from said first, upstream service vessel to partly regenerate the ion exchange material in said second vessel, said regenerant being introduced directly into said first vessel and passing in series through said first vessel and then through said second vessel and thereafter,
 (ii) moving the point of regenerant introduction downstream to directly introduce regenerant into said second service vessel and passing the regenerant therethrough to substantially completely regenerate the ion exchange material in said second service vessel.

2. A method as set forth in claim 1 further comprising the steps of:
   (a) passing a rinse fluid through said first vessel after regeneration to remove excess regenerant from the bed therein; and
   (b) passing at least part of the rinse effluent from said first service vessel in series through said second, downstream vessel prior to introducing regenerant directly into said second service vessel.

References Cited
UNITED STATES PATENTS

| | | | |
|---|---|---|---|
| 2,458,115 | 1/1949 | Swenson | 210—30 X |
| 2,754,261 | 7/1956 | Akeroyd | 210—34 |
| 3,351,550 | 11/1967 | Kraiker, Jr. | 210—34 |

SAMIH N. ZAHARNA, Primary Examiner